United States Patent [19]
Butte

[11] Patent Number: 5,941,165
[45] Date of Patent: Aug. 24, 1999

[54] APPARATUS FOR CONTINUOUSLY PROCESSING DRIED SOLID PRODUCTS

[76] Inventor: Jeffrey C. Butte, 10931 SE Mather Rd., Clackamas, Oreg. 97015

[21] Appl. No.: 09/110,770

[22] Filed: Jul. 6, 1998

[51] Int. Cl.⁶ .............................. A23L 1/00; A23L 1/34; A23L 3/00; A23L 3/10
[52] U.S. Cl. ............................ 99/355; 99/330; 99/407; 99/470; 99/516; 34/168; 34/174
[58] Field of Search ................ 99/326–331, 352–355, 99/403–410, 417, 418, 467, 468, 470, 516, 534–536, 483, 484, 486; 426/523, 508–511; 34/164, 168, 174, 177–180, 275, 282; 432/45, 46, 50, 55, 139, 141

[56] References Cited

U.S. PATENT DOCUMENTS

| | | | |
|---|---|---|---|
| 3,703,861 | 11/1972 | Slacke et al. | 99/470 X |
| 3,718,322 | 2/1973 | Skelton | 99/468 X |
| 3,719,502 | 3/1973 | Keely | 99/168 |
| 3,721,018 | 3/1973 | Brandt et al. | 34/168 |
| 4,059,919 | 11/1977 | Green | 47/1.1 |
| 4,125,063 | 11/1978 | Jelks | 99/516 X |
| 4,196,224 | 4/1980 | Falk | 99/534 X |
| 4,214,013 | 7/1980 | Hirahara | 426/629 |
| 4,525,370 | 6/1985 | Parkes | 426/508 |
| 4,543,263 | 9/1985 | Goldhahn | 426/520 |
| 4,543,878 | 10/1985 | Luchetti | 99/330 |
| 4,601,910 | 7/1986 | Saub | 426/634 |
| 4,882,188 | 11/1989 | Sawada et al. | 426/509 X |
| 4,901,632 | 2/1990 | Lori | 99/407 X |
| 4,940,598 | 7/1990 | Zanichelli | 426/507 |
| 5,213,831 | 5/1993 | Leggott et al. | 99/355 |
| 5,361,682 | 11/1994 | Crolla | 99/352 |
| 5,385,083 | 1/1995 | Toyokura | 99/355 |
| 5,425,960 | 6/1995 | Holmes | 99/536 X |
| 5,429,041 | 7/1995 | Zittell | 99/355 X |
| 5,546,849 | 8/1996 | Shefet | 99/330 |

OTHER PUBLICATIONS

*Quality Aspects of Moisture, Soaking and Blanching in Dry Bean Processing* Mark A. Uebersax Ph. D. Proc. The Food Processors Inst. Technical Conf. On Dry Bean Res., San Francisco, CA. FPI, Washington, D.C. (Feb. 13, 1985) pp. 7–22.

*Navy Bean Processing: Effect of Storage and Soaking Methods on Quality of Canned Beans* M. A. Uebersax C. L. Bedford. MSU Ag. Expt. Sta. Research Report: No. 410 (1980).

Structural and Compositional Changes During Processing of Dry Beans (*Phaseolus vulgaris*) Mark A. Uebersax Songyos Ruengsakulrach Referenced Chapter 10, In *ACS Symposium Series 405, Quality Factors of Fruits and Vegetables Chemistry Technology.* J.J. Jen, (Ed.) (1989) pp. 111–124. American Chemical Society Washington, D.C.

*Primary Examiner*—Timothy F. Simone
*Attorney, Agent, or Firm*—Brian J. Deagle; Jeffrey B. Oster

[57] ABSTRACT

There is disclosed an apparatus that provides an apparatus for continuously re-hydrating, cooking or blanching dried solid products. Specifically, the apparatus provides controlled high pressure and temperature to continuously re-hydrate, cook or blanch dried food products while maintaining food product integrity and quality.

11 Claims, 4 Drawing Sheets

APPARATUS FOR CONTINUOUSLY PROCESSING DRIED SOLID PRODUCTS

TECHNICAL FIELD OF THE INVENTION

The present invention provides an apparatus for continuously re-hydrating, cooking or blanching dried solid products. Specifically, the apparatus provides controlled high pressure and temperature to continuously re-hydrate, cook or blanch dried food products while maintaining food product integrity and quality.

BACKGROUND OF THE INVENTION

Many food products are dried for purposes of packaging, storage and longevity. For example, dehydrated beans remain stable for a significant time prior to use, as compared to their hydrated counterpart. In certain food processing operations such as frozen food entree packaging, however, the dehydrated beans must be re-hydrated. In some applications, re-hydration may be combined with cooking or blanching.

Most dry vegetable products consist of a skin and a starchy inner substrate. Re-hydration procedures reintroduce water into the inner substrate by passing through the skin. In such re-hydration processes the skin acts as a natural membrane surface, passing much more fluid through than it itself absorbs. The rate of absorption is proportional to several variables among which are temperature and pressure to which the product is exposed. One example of bean re-hydration is simply soaking the beans in water.

Bean hydration by cold soaking can take up to 24 hours and, as a result, exacerbate product color loss and reduce quality.

Other re-hydration processes apply temperature and pressure to decrease re-hydration processing time. Processing at increased temperature and pressure create different problems. High temperature and pressure can create product damage or impair product quality.

Further, releasing pressure at a time when the temperature is above the boiling point of water for a new, lower pressure, causes the skin of beans to rupture. Slowly cooling the product can reduce the risk of damage. This, however, increases re-hydration time.

Both cold soaking and increased pressure and temperature re-hydration use batch processes. Batch process tend to be expensive, because of high labor costs and, for the latter process, energy costs. To control and eliminate product damage when processing at increased temperature and pressure, each batch must be cooled entirely before the internal pressure can be released. The batch process is energy inefficient, because a single vessel is both heated and cooled. Moreover, repeated heating and cooling cycles create stress on the pressure vessels, which shorten their useful life and create potential workplace hazards.

Others have attempted to solve these batch processes problems through continuous process apparatus. Most of these solutions merely provided multiple batch vessels, and do not deliver a true continuous process. These apparatuses retain the problems associated with batch processes. Other attempts at providing a true continuous process apparatus have proved impracticable, because the required equipment size lengths grow beyond practical manufacturing facility boundaries.

In summary, existing batch food processing systems are slow, labor intensive, inefficient, and subject the product to potential quality impairment. The food processing industry needs an apparatus which will decrease processing time, save energy, increase yields and insure product quality. The present invention provides a solution to that need.

SUMMARY OF THE INVENTION

The present invention provides an apparatus for continuously re-hydrating, cooking or blanching dried food products by processing at elevated pressure and temperature to achieve requisite retention times. The water and food product combination moves continuously through the inventive apparatus thereby yielding a continuous output of rehydrated, cooked or blanched food product from a continuous input of water and dried food product.

The present invention provides an apparatus for continuously hydrating, cooking or blanching solids, comprising:

(a) a first elongated chamber (Items 1 through 25, FIG. 2) having an interior space defined by walls and further comprising (i) an inlet connected to an aqueous solvent source and a solids source (ii) an outlet, (iii) a pumping means for increasing pressure within the interior of the first elongated chamber, (iv) a heating means for increasing temperature within the first elongated chamber, and (v) a conveyance means for conveying and mixing the aqueous solvent and the solid source through the first elongated chamber;

(b) a second elongated chamber (Items 26 through 31, FIG. 2) having an interior space defined by walls and further comprising (i) an inlet connected to the outlet of the first elongated chamber, (ii) an outlet, and (iii) a means for slowly conveying the solid within the aqueous solvent through the second elongated chamber while maintaining pressure and temperature within the interior space of the second elongated chamber; and (c) a third elongated chamber (Items 32 through 41, FIG. 2) having an interior space defined by walls and further comprising (i) an inlet connected to the outlet of the second elongated chamber, (ii) an outlet, (iii) a cooling means for decreasing temperature within the third elongated chamber (iv) a pressure reduction means for decreasing the pressure within the third elongated chamber, and (v) a conveyance means for continuously conveying the combined aqueous and solid source through the outlet of the third elongated chamber.

Preferably, the means for slowly conveying the solid within second elongated chamber comprises (A) a rotating spiral tubular structure, (B) two rotating spiral tube structures having a common axis of rotation, or (C) a double helix tube structure. Preferably, the first elongated chamber further comprises a tank having a plurality of inlets and one outlet connected to the inlet of the first elongated chamber, wherein one inlet is connected to an aqueous source, and a second inlet is connected to a solid source, wherein the tank further comprises: (i) a mixing means for continuously combining the aqueous solvent and the solid, and (ii) a metering means for continuously discharging the mixed aqueous solvent and solid.

Preferably, the apparatus for continuously hydrating, cooking or blanching solids further comprises a fourth elongated chamber (Items 42 through 44, FIG. 2) having an interior space defined by walls comprising an inlet, an outlet, and a screen having an opening diameter less than a mean particle diameter of the solid, wherein the inlet is connected to the outlet of the third elongated chamber, and the outlet is connected to the inlet of the first elongated chamber.

Most preferably, the apparatus for continuously hydrating, cooking or blanching solids further comprises:

(a) a fifth elongated chamber (FIG. 4 and Item 48, FIG. 3.) having an interior space defined by walls having a plurality of inlets and a plurality of outlets, wherein one inlet is connected to the outlet of the second elongated chamber, and having (i) a conveyance means for conveying the mixed aqueous solvent and solid source through the fifth elongated chamber, (ii) a second inlet connected to a fluid source with a temperature lower than that of the mixed aqueous solvent and solid source, (iii) a transfer means for transferring the solid source from the aqueous solvent to the fluid source, (iv) a first conveyance means for continuously conveying the mixed solid source and fluid source through one outlet of the fifth elongated chamber which is connected to the inlet of the third elongated chamber, and (vi) a second conveyance means for continuously conveying the aqueous solvent through another outlet of the fifth elongated chamber, and (b) a sixth elongated chamber (Item 46, FIG. 3) having an interior space defined by walls with a plurality of inlets and a plurality of outlets, wherein one inlet is connected to the mixed aqueous solvent source and solids source before the first elongated chamber, and having (i) a first conveyance means for conveying the mixed aqueous solvent source and solids source through the sixth elongated chamber, (ii) a second inlet connected to a fluid source with a temperature higher than that of the mixed aqueous solvent source and solids source, (iii) a transfer means for transferring the solid source from the aqueous solvent to the fluid source, (iv) a second conveyance means for continuously conveying the mixed solid source and fluid source through one outlet which is connected to the inlet of the first elongated chamber, and (v) a third conveyance means for continuously conveying the aqueous solvent through another outlet of the sixth elongated chamber.

Preferably, (as depicted in FIG. 3) (a) the fluid source inlet in the fifth elongated chamber is connected to the aqueous solvent outlet of the sixth elongated chamber, and (b) the fluid source inlet in the sixth elongated chamber is connected to the aqueous solvent outlet of the fifth elongated chamber.

Preferably, the apparatus for continuously hydrating, cooking or blanching solids further comprises a seventh elongated chamber (Item 50, FIG. 3) having an interior space defined by walls having an inlet, an outlet and a cooling means for decreasing the temperature of the combined aqueous and solid source to approximately 0° C., wherein the inlet is connected to the outlet of the third elongated chamber.

The present invention is used to continuously re-hydrate over 19000 kg per hour of dried legumes and the like, by selecting a pressure greater than 1.75 kg/cm$^2$, a temperature of approximately 115 to 135° C., and adjusting the time period at the second elongated chamber to be adequate to re-hydrate the dried legumes.

DETAILED DESCRIPTION OF THE INVENTION

The specific structures illustrated herein and the associated temperature, pressure and material flow calculation and estimates discussed herein are well suited for bean re-hydration but may be modified as necessary when applying the subject matter of the present invention to an alternative food product, or when combining with cooking or blanching.

Figure 2:
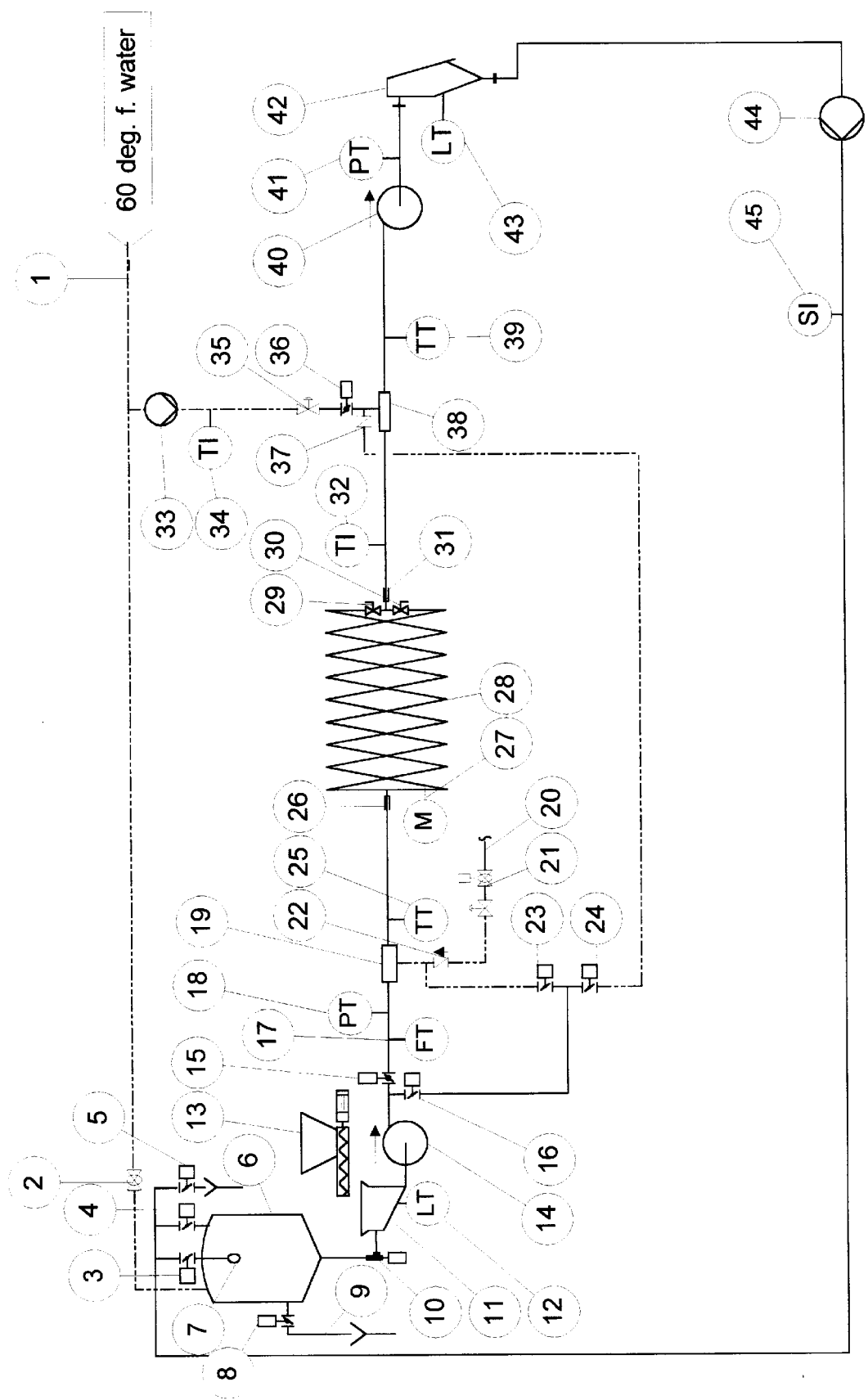
FIG. 2 illustrates a preferred bean hydration apparatus, according to the present invention, but with additional design features. The water enters Tank (6) and is combined with the dry beans (from Feeder (13)) at Hopper (11), conveyed at elevated pressure by First Pump (14), heated to elevated temperature with steam at First Injector (19), provided dwell time through Rotary Coil (28), cooled with water at Second Injector (38), returned to atmospheric pressure at Second Pump (40), and dewatered at Screen (42).

FIG. 2 illustrates a schematic of a preferred continuous hydration apparatus for bean re-hydration. In FIG. 2, a Water Supply (1) provides an aqueous solvent, for example water, at a given temperature and temperature (e.g., 15.6° C., and 3.15 kg/cm$^2$). Water Supply (1) in the illustrated embodiment is a typical municipal water supply. Certain material flow and temperature calculations, in the particular embodiment illustrated here, depend on the pressure and temperature of water provided by Water Supply (1). Accordingly, it is preferred that the condition of water provided by Water Supply (1) be measured and monitored for consistency. For example, First Temperature Sensor (34) provides indication of the temperature of water provided by Water Supply (1). Sensors monitoring the condition (e.g., temperature and/or pressure of water provided by Water Supply (1)) may be monitored manually or by automated process control elements.

Water (or aqueous solvent) from Water Supply (1) enters Tank (6). Under normal operating conditions, water enters Tank (6) only during initial filling of the system prior to operation. However, automatic water level control may optionally be provided for safety reasons. Level control in Tank (6) is provided by means of Overflow (9). This overflow is routed to drain, and is enabled by a First Product Valve (8). Tank (6) serves as a buffering accumulator for process water in the system. Water flows from Tank (6) into Hopper (11) by means of gravity. Water level in Hopper (11) is controlled automatically. For example, Level Transmitter (12) is coupled to a level control device, which emits a control signal to an I/P transducer, to provide a controlled pneumatic signal to Second Product Valve (10). Second Product Valve (10) is a proportioning control valve, and modulates to effectively control the amount of water entering Hopper (11). Hopper (11) is an open topped, rectangular or cylindrical tank with a steeply sloped bottom. Dry beans are metered into this hopper by Feeder (13). Feeder (13) consists of a dry product hopper and a discharge screw feeding device. Beans discharged by Feeder (13) fall into Hopper (11), and sink to the bottom due to their high specific gravity relative to water. The bean and water slurry is thus fed into First Pump (14).

First Pump (14) provides a driving force to propel the water and bean combination through the apparatus. The First Pump is designed to minimize physical damage to the solid material. For example, a rotary positive displacement variety, progressive cavity, disc type or food handling centrifugal. Beans and water exiting First Pump (14) are carried along at turbulent flow rates (i.e., 3–8 feet/sec. flow velocity), to keep the solid material from settling, past a Third Product Valve (15) and a First Flow Meter (17). The First Flow Meter (17) is an electromagnetic flow measuring device having a signal that may be used for flow indication, or for automatic control of First Pump (14). For example, by taking the output signal of the First Flow Meter (17) to an electronic loop control device, having an output connected to a variable frequency drive (inverter) which feed electrical power to First Pump (14). Optionally, First Pump (14) speed may be slaved to match the rotational speed of the Rotary Coils (28), or controlled manually. A Third Product Valve (15) is opened for normal processing, and closes only if an abnormal pressure loss is sensed by a First Pressure Sensor (18). The Third Product Valve (15) is also closed as part of cleaning procedures to rout cleaning solutions to other areas of the system.

The bean in water slurry (solid material) is heated by direct incorporation of saturated steam at First Injector (19). The First Injector (19) consists of, for example, a double tube configuration with the inner pipe perforated to provide steam passage, or it is a commercially available manufactured device (e.g., Pick Manufacturing, or Fox Valves Development Corp.). Direct steam incorporation is used to quickly raise the bean and water slurry to desired temperatures (approximately 115.5° C.). Pre-heated water may be injected rather than steam. The temperature of the heated slurry is monitored by Second Temperature Sensor (25), or optionally, by using the steam pressure at the point of entry into First Injector (19) and deducing the temperature. The output of the Second Temperature Sensor (25) is coupled to a control loop having an input from the Second Temperature Sensor (25) and an output First Control Valve (21). The First Control Valve (21) controls and delivers a precise amount of steam to First Steam Injector (19). A First Steam Block Valve (20) is used to shut off the supply of steam to the apparatus or first elongated tube in the event of loss of control of temperature, and is used to cut off the supply of steam to the apparatus when it is not in use (i.e., 99° C.–130° C.). A Second Steam Check Valve (22) prevents the back flow of process water or cleaning solutions into the steam supply.

The bean and water slurry (solid material) move at turbulent flow rates (i.e., about 3–8 feet/sec. flow velocity), at controlled temperature and pressure into a Rotary Coil (28). Maintenance of elevated temperatures and pressure accomplishes accelerated hydration and/or cooking velocity, while the flow velocity of the slurry prevents the product from settling in the product piping. Rotary Coil (28), in concert with other system elements, provides surprising precise control of pressure, temperature, and, most importantly, retention time. The precision control provides flexibility in process parameters, that is, pressure and temperature, in a low shear process, therefore maintaining product quality.

A rotating double helix tubular conveyor at Rotary Coil (28) conveys the beans at a positive rate and provides sufficient product dwell times to ensure complete hydration or cooking. Rotary Coil (28) rotates on First Union (26) and Second Union (31), which may either be mechanical seals, or packing gland arrangements. Rotary Coil (28) is mounted on trunnion wheels which is powered by a motor to provide rotational control. A variable frequency drive is applied to the motor. The rotational speed determines the dwell time, that is the length of time the beans, or other product are held at the selected temperature and pressure. The tubular spiral structure also provides positive forward movement, that is, "first in, first out" under a minimal shear environment. The larger structure of the tubular conveyors creates laminar flow conditions which allow the beans to settle in the bottom of the coil structures. The mass of beans added to the system and the rotational speed of the coil structure determines the load depth of beans in the coil structure, because the rate of water flow is constant.

The Rotary Coil (28) comprises of tubular spirals of pipe (typically 8" diameter). These spirals are offset 180 degrees about a common axis to form a double helix, connected at either end. As product passes First Union (26), the pipe "tees" with each branch enlarging as it enters the spiral. At the discharge end of the rotary coils a similar structure exists. However, the discharge branches, prior to joining before Second Union (31), are equipped with Fifth Valve (29) and Sixth Valve (30). Fifth Valves (29) and Sixth Valve (30), are quarter-turn ball valves, equipped with spring actuated handles, which ride in a cam. As the coil rotates, the valves direct the flow of water and beans to either of the respective spiral conveyors. At the infeed end, beans will settle into whichever coil feed branch is below the level of First Union (26). At the discharge end, the appropriate valve is held open to direct the entire flow of beans and water into this branch. Fifth Valve (29) and Sixth Valve (30) are always opposed, in that when Fifth Valve (29) is open, Sixth Valve (30) is closed and vice versa. At the time beans and water are entering one of the two spiral conveyors, they are being discharged at the opposite end. Thus, the bean and water slurry is always being fed and discharged into one of the two tubular conveyors. The flow of water aids in discharging product from the tubular conveyor, because the hydrated beans are closer to the specific gravity of water. The position of the connecting pipe branch to the tubular conveyor, at the feed and discharge ends, are positioned to optimize the feed and discharge characteristics of the product.

Beans and water exiting the tubular conveyor pass into smaller diameter pipe to produce turbulent flow conditions and flow rates. The bean and water slurry passes Second Union (31) and Third Temperature Sensor (32). Third Temperature Sensor (32) is used to provide temperature information to compensate for heat losses in the tubular conveyors due to radiation. The bean and water slurry passes through Second Injector (38), where cold water is introduced. Cold water is introduced for two reasons, to replace the water into the system which is absorbed by the beans during hydration, and to cool the beans to the desired temperature (below the boiling point of water at atmospheric pressure). A branch of Water Supply (1) passes through First Control Valve (35) and First Isolation Valve (36) to Second Injector (38). Second Injector (38) is typically a double tube device with a perforated inner pipe through which the bean and water slurry passes. The cold water is forced from the outer pipe into the slurry through the perforations. The final temperature is detected at Fourth Temperature Sensor (39). A control loop provides a controlled pneumatic signal to First Control Valve (35) to achieve precise control of cooling water. Alternately a metering pump may be employed. If the pressure of the city water supply is insufficient to overcome the internal pressure of the system (Typically 2.8–3.5 kg/cm$^2$) a booster pump, (Second Pump 33) is employed to increase the cold water pressure. A First Isolation Valve (36) is normally open during normal processing, it is closed during abnormally high system pressure, and during cleaning, to prevent cleaning solutions from entering the city water supply. A First Check Valve (37) admits cleaning solutions to the city water supply side of a Second Injector (38) and prevents back flow of cooling water through this pipe.

The cooled bean and water slurry is fed into a Second Pump (40). The function of the Second Pump (40) is to lower the pressure of the bean and water slurry from processing requirements, to atmospheric pressure, and to deliver the bean and water slurry to a Screen (42). The Second Pump (40) may be a progressive cavity type, a "disc" centrifugal type, or a rotary positive displacement type. Alternately, since no "pumping" is actually occurring, that is, pressure is reduced rather than increased, valve arrangements may be substituted, such as a rubber hose "pinch" valve, powered rotary valve, or two valves operating in opposite positions, similar to the Fifth Valve (29) and the Sixth Valve (30). The selection of any of the above is determined to maximize safe operation and minimize product damage and maintenance. A Second Pump (40) is controlled by a First Pressure Sensor (41). The output of First Pressure Sensor (41) is fed into a control loop, the output of which is fed into a variable speed drive (ac inverter) to control the speed of the Second Pump (40) in order to achieve a constant flow of product at a constant discharge pressure. The bean and water slurry is conveyed at turbulent velocities (i.e., about 3–8 ft./sec. flow velocity) to a Screen (42). The Screen (42) may be either a stationary screen, a screen mounted on a vibratory conveying device, or a rotating drum-type screen. The function of the Screen (42) is to separate the finished product from the water stream. The water stream is pumped by a Third Pump (44) back to Tank (6) for re-circulation through the system. If the rate of water injection at Second Injector (38) exceeds rate of water absorption by the product, then the surplus water is routed to drain through the First Product Valve (8) and the Overflow (9).

If the re-hydration, cooking or blanching process results in the introduction of free starches into the process water, the saturation level may be monitored by a Fifth Sensor (45), for example, an in-line process refractometer or a mass flow meter. In the event that starch levels exceed set-point levels, the process water can be directed to drain at the Seventh Valve (5), and make-up water added to the system though the Eighth Valve (2).

The apparatus can be cleaned and sanitized in situ. Cleaning chemicals are added either manually or automatically to Tank 1. Under cleaning, temperatures typically do not exceed 74.8° C., thus no cooling water injection is required. The Third Pump (1) is used to circulate cleaning solutions through the system while the Ninth Valve (15), Tenth Valve (16), Eleventh Valve (23) and Twelfth Valve (24) route cleaning solutions respectively through the Rotary Coil (28), the steam side of Injector (19) and the cold water side of Second Injector (38). When the Thirteenth Valve (3) is opened, cleaning solutions pass through Spray Device (7) in order to clean Tank (6).

ADVANTAGES OF THE PRESENT INVENTION

One advantage of a continuous process, as opposed to existing batch methods, is the ability to produce a chilled product. Many food products are frozen rather than canned. It is advantageous when producing a frozen product to remove as much heat as possible prior to the freezing process, mainly because water is a much more efficient conductor of heat than air. Most modern IQF (Individually Quick Frozen) freezing systems employ ammonia as a refrigerant, thus air, circulated by powerful fans, is used to remove heat from the product. By combining heating and cooling in a single apparatus, it is possible to "pump" heat from one side of the apparatus to another. Such regenerative features save about 2 btus of energy for each btu of regeneration, (1 less btu required for heating and 1 less btu required for cooling). In traditional batch processes, the heating and cooling apparatus are entirely separate. Thus, each btu of heat added must be mechanically removed when cooling.

Figure 3:
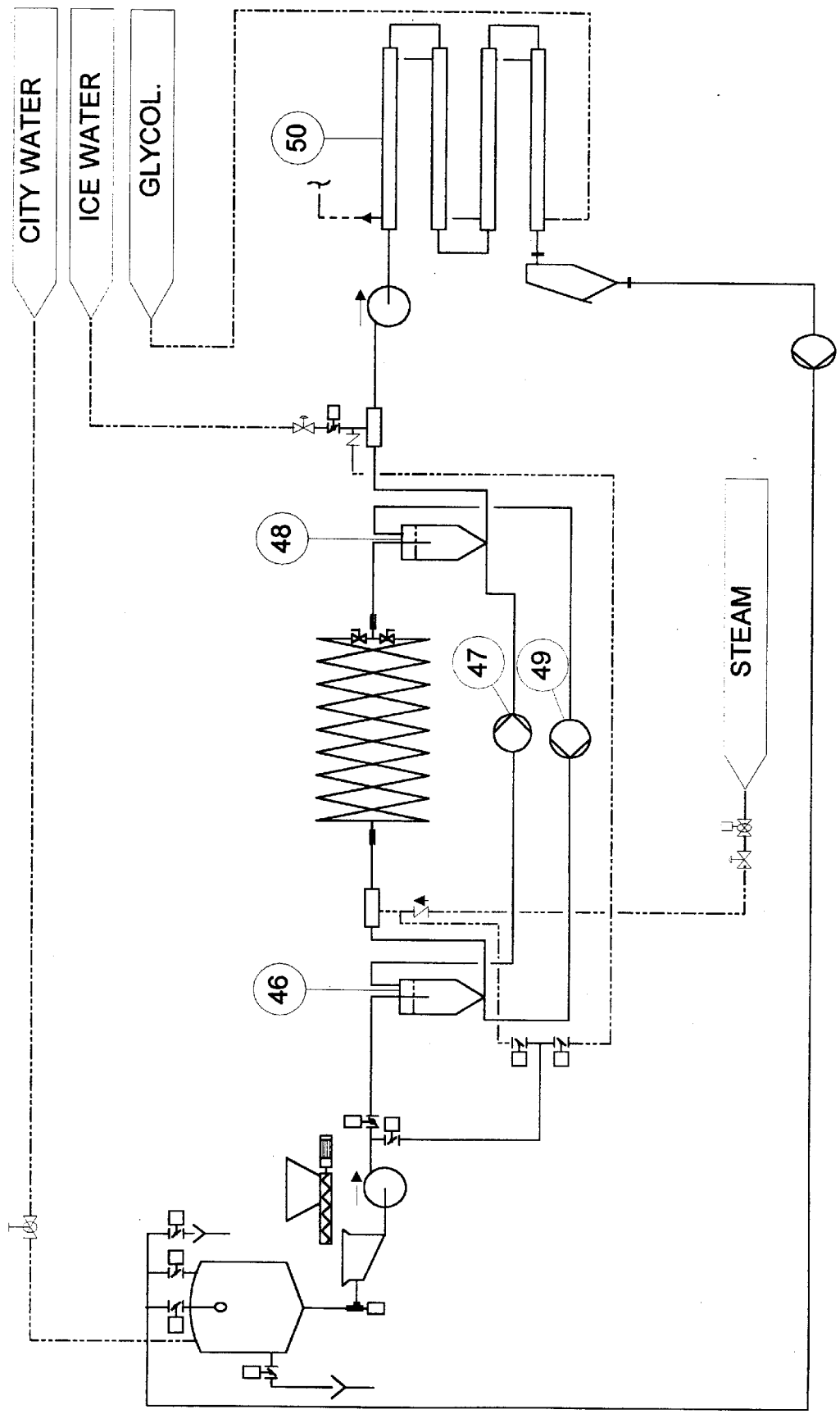
FIG. 3 illustrates the preferred bean hydration system depicted in FIG. 2, with additional features. Water and beans are pre-heated at First Vessel (46), prior to heating at First Injector (19), in a closed loop with water discharged from pre-cooling at Second Vessel (48), prior to cooling at Second Injector (38). Also, before dewatering at Screen (42), the combined water and beans are cooled to a final temperature of approximately 0° C. using Heat Exchanger (50).

FIG. 3 illustrates a continuous hydration apparatus as applied to bean re-hydration. It has the following modifications from the apparatus shown in FIG. 2. Features have been employed to achieve cooling water and energy conservation. Specifically, at a point after the dry bean and water slurry has passed through the First Pump (14), but before passage through First Steam Injector (19), the bean and water slurry passes through a First Vessel (46). A First Vessel (46) can be any one of several possible heat exchange devices, for example, an existing double tube heat exchanger might be employed, a type that is well known in the art, or the type depicted in FIG. 4.

Alternately, an injection tube, similar in design to the First Injector (38), can be employed. In this fashion, water is injected across a bean and water slurry, with an identical amount of slurry drawn off the opposite side. This design creates addition turbulence within the bean and water slurry, and permits a larger diameter pipe to be employed for the passage of the bean and water slurry at the point of injection. If this mechanism were employed, it is configured in such a fashion as to minimize mixing of temperatures within the bean and water stream, since substantial temperature averaging of the streams of water would substantially reduce the amount of heat which can be transferred by such action. This could be accomplished, for example, with the use of internal baffles in the injection chamber.

Figure 4:
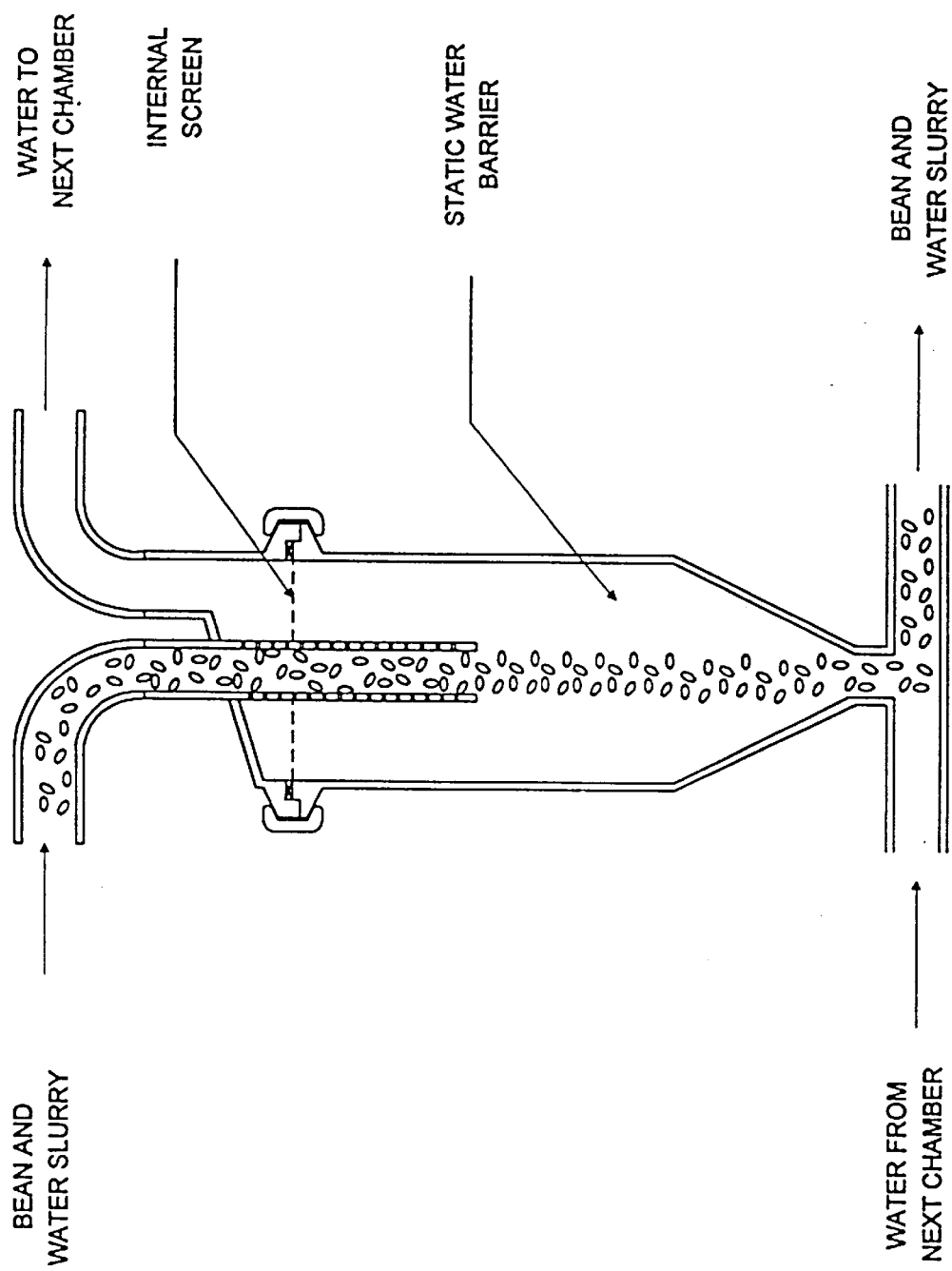
FIG. 4 illustrates an optional fifth, sixth or seventh elongated chamber.

A preferred design for the First Vessel (46) is a chamber, as depicted in FIG. 4 into which the bean and water stream is fed into the top of the chamber. Due to their high specific gravity, relative to water, the beans drop through to the bottom of the chamber, the bottom of which is cone-shaped, or otherwise shaped in such a fashion as to concentrate the product and guide it to the exit where it is accelerated by the current of a secondary liquid stream, i.e., to direct the beans to a central outlet. The water carrier, which feeds the chamber exits through a separate outlet, is located at the top of the chamber. An internal screen, within the chamber, prevents beans from being carried with this water. The area of the chamber, relative to the flow of water creates laminar flow conditions within the chamber, in order to minimize currents which might carry the beans toward the screen. A secondary flow of water passes across the bottom of the chamber, this pipe being connected to the chamber by means of a tee. In such a fashion, beans are allowed to pass between two interconnected streams of water, with a high temperature variance, with minimal temperature mixing of the two streams.

It should be noted that due to the continuous re-circulation of process water within the systems, as depicted in FIG. 3, if the beans are cooled substantially then this water requires much more heat added to restore hydration and/or cooking temperatures. By pre-heating this stream prior to steam injection, the total energy load and steam consumption is substantially reduced. The water used for injection originates from an injector or heat exchanger of similar design located on the hydrated, or cooked product stream, located after the Second Rotary Union (31) and before cooling water Second Injector (38).

This device, identified on the schematic as the Second Vessel (48), is one of several heat exchange devices, for example, an existing double tube heat exchanger might be employed, a type that is well known in the art, or the type depicted in FIG. 4, and described above. Alternately, an injection tube, similar in design to the Second Injector (38), is used.

Heat is transferred from the Second Vessel (48) to the First Vessel (46) by two centrifugal style pumps, Fourth Pump (47) Fifth Pump (49). By passing the bean and water stream through Second Vessel (48), the subsequent reduction in heat of the product and water stream is used to reduce the amount of water added to the system by the Second Injector (38). If producing a hot end product is desirable, this action would permit operation of the system, using ambient temperature water typically derived from municipal sources without any excess water discharges at Overflow (9). Alternately, by injecting refrigerated water at Second Injector (38), additional cooling can be achieved. Additional cooling of the beans or product prior to discharge from the system at Screen (42) can be achieved by adding a double tube heat exchanger, or other appropriate heat exchange device after pressure has been released from the system by Second Pump (40), but prior to product discharge at Screen (42). Glycol or brine would be used as a heat transfer medium in this device.

The system as depicted in FIG. 3 is configured to produce an end product temperature of 1.9° C. The usage of regeneration, and the injection of 1.7° C. for water make-up produces an overall energy economy of 67%, with no net discharge of process water. This level of economy is predicated on minimal mixing of process water, and injected water at First Vessel (46) and Second Vessel (48).

EXAMPLE 1

The following heat transfer calculations, flow estimates and temperature estimates are provided for various portions of the inventive apparatus (FIG. 2). These data provide system operation parameters for re-hydrating and cooking de-hydrated beans, such as kidney beans.

| A. | Dry Bean/Water mixing | | |
|---|---|---:|---|
| | Mass Flow Water | 19000.00 | kg |
| | Mass Flow Beans | 4086.00 | kg |
| | Water Temperature | 93.5.00° | C. |
| | Bean Temperature | 15.5.00° | C. |
| | Mixed Temperature | 86.3° | C. |
| | Dry Bean/Water Heating | | |
| | Mass Flow Heating Water and Beans | 15436.00 | kg |
| | Water Temperature | 86.9° | C. |
| | Delta T, Water Temp. Rise | 11.1° | C. |
| | Delta T, Steam Temp. Drop | 14.6° | C. |
| | Steam Temperature (4.2 kg/cm$^2$) | 147.9° | C. |
| | Lbs/hr Steam (903 btu/lb.) | 897.15 | kg |
| | Mixed Temperature | 115.3° | C. |
| | Cooling Water Injection | | |
| | Mass Flow Beans and Water | 16344 | kg |
| | Mass Flow Water | 4086 | kg |
| | Bean/Water Temperature | 115.3° | C. |
| | Water Temperature | 12.9° | C. |
| | Mixed Temperature | 95° | C. |

-continued

| Heat Load Summary | | |
|---|---:|---|
| Heating | 18020000.0 | Btu/hr. |
| Total | 18020000. | Btu/hr. |

Specific Heat of Dry Kidney Beans = 0.28
Specific Heat of Hydrated Beans approx. 0.75

In the system illustrated above and schematically depicted in FIG. 2, no specific water-to-product ratios are required for system operation. Water circulation rate is determined to convey finished product to the de-watering screen at minimal damage levels, cool finished product to required temperatures and minimize surplus water to drain. It should be noted surplus water can be further reduced by using chilled water, rather than water at ambient temperatures, for injection.

Figure 1:
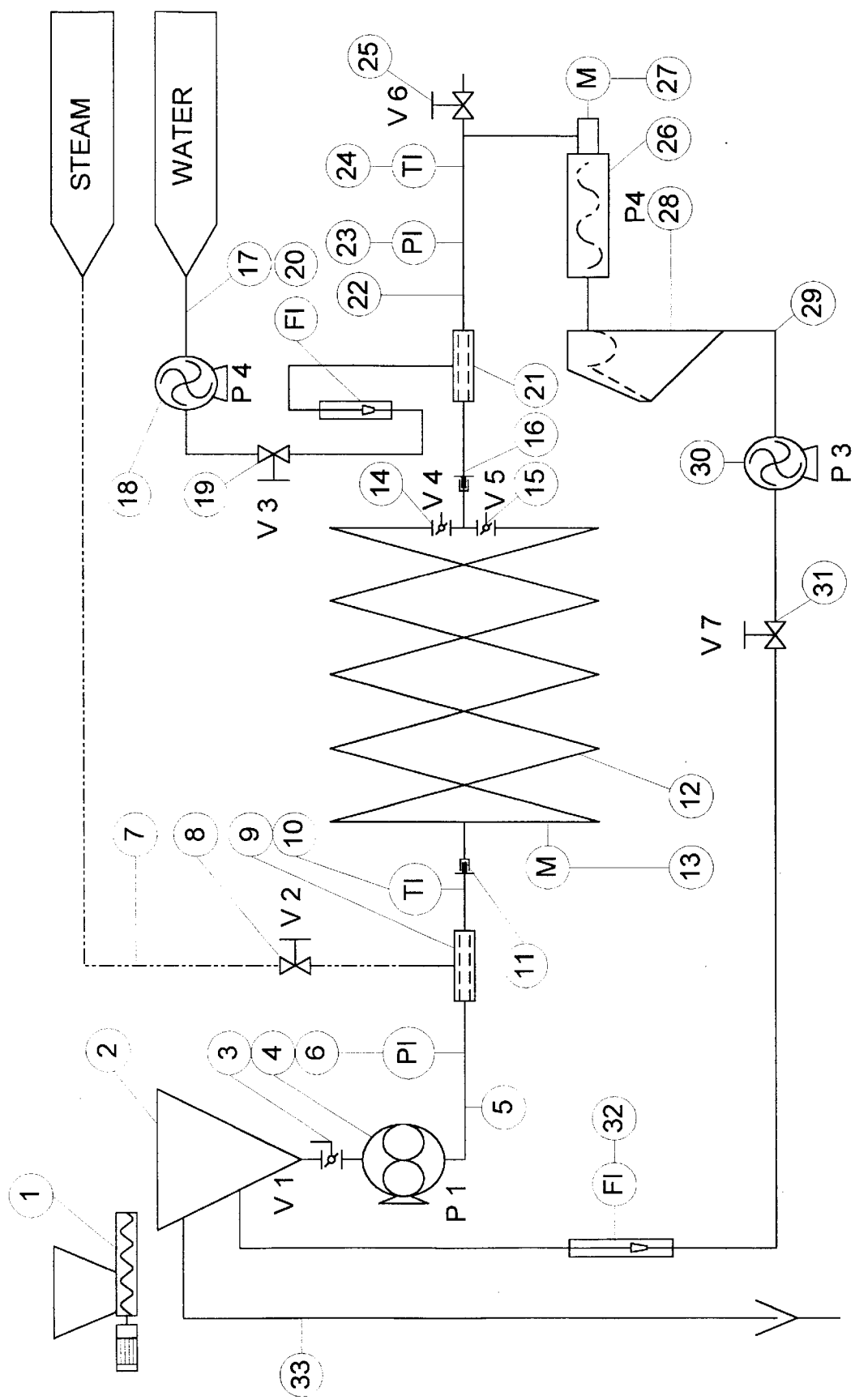
FIG. 1 illustrates a simplified bean re-hydration process using an embodiment of the inventive apparatus. Water and dried beans (from Hopper (1)) are combined at Tank (2), conveyed at elevated pressure by First Pump (4), heated to elevated temperature with steam at First Injector (9), provided dwell time through Rotary Coil (12), cooled with water at Second Injector (21), returned to atmospheric pressure at Second Pump (26), and dewatered at Screen (28).

Assuming that the system or apparatus illustrated in FIG. 1 operates at 8172 kg per hour of finished product, and that the flow exiting the rotary coil conveyors carries a ratio of 0.9 kg of water per kg of re-hydrated beans, at which point the beans may be assumed to approximate the weight of water, the apparatus output is 16344 kg per hour. Using a bean exit temperature of approximately 95° C. as sufficient to prevent splitting or other damage, and cooling water injection temperature of 13.3° C., 4086 kg of water are applied, resulting in a surplus flow of water to drain of approximately zero. It should be noticed that radiative heat losses, as well as evaporative heat losses at the de-watering screen, are ignored. A modest temperature loss of 1.41° C. is assumed, in re-circulation of water from the de-watering screen back to Tank (6).

In this scenario, 4086 kg per hour of dry beans are mixed with 11350 kg per hour of water, at a temperature of 93.8° C., resulting a dry bean-to-water ratio of approximately 1.6 kg of water to one kg of dry beans. The resulting steam consumption to heat this slurry to 116.5° C. is 897 kg per hour at 4.2 kg/cm$^2$, resulting in 897 kg of water added to the slurry to provide the mass flow of 16344 kg of water and beans in the helical tubular conveyors. The particular pressures and temperatures illustrated herein, however, may be varied by achieving the same result. These temperatures and pressures being an estimate of the preferred mode of operation for the system as outlined above and schematically depicted in FIG. 2.

EXAMPLE 2

While the inventive apparatus shown in FIG. 3 may be operated in a variety of configurations, temperatures, product dwell times, and pressures, the following discussion generally characterizes system operation. The following heat transfer calculations, flow and temperature estimates at various points of the system describe the system with elements added for conservation of energy, and the production of a chilled final product.

| Dry Bean/Water mixing | | | | |
|---|---|---|---|---|
| Mass Flow Water | 12394.2 | kg | | |
| Mass Flow Beans | 2270 | kg | | |
| Water Temperature | 1.4° | C. | | |
| Bean Temperature | 15.4° | C. | | |
| Mixed Temperature | 3.3° | C. | | |
| Regenerative Heating | | | | |
| Mass Flow Beans | 2270 | kg | | |
| Mass Flow Water | 12394.2 | kg | | |
| Bean Temperature (In) | 5° | C. | | |
| Return Water Temperature (In) | 110° | C. | | |
| Bean Water Temperature (Out) | 93.3° | C. | Btu Exchanged | 5050500 Btu\hr |
| Return Water Temperature (Out) | 72° | | | |
| Dry Bean/Water Heating | | | | |
| Mass Flow Heating Water | 15563.12 | kg | | |
| Water Temperature | 93.4° | C. | | |
| Delta T, Water Temp. Rise | 11.1° | C. | | |
| Delta T, Steam Temp. Drop | 14.4° | C. | | |
| Steam Temperature (4.2 kg/cm$^2$) | 147.9° | C. | Btu Exchanged | 1371200 Btu\hr |
| Lbs/hr Steam (903 btu/lb.) | 899.35 | kg | | |
| Mixed Temperature | 115.6° | C. | | |
| Regenerative Cooling | | | | |
| Mass Flow Beans | 4540 | kg | | |
| Mass Flow Heating Water | 1.1077.6 | kg | | |
| Bean/Water Temperature (In) | 115.6° | C. | | |
| Flow Heating Water (In) | 7.3° | C. | | |
| Bean/Water Temperature (Out) | 38.1° | C. | Btu Exchanged | 5050500 Btu\hr |
| Return Water Temperature (Out) | 110° | C. | | |
| Cooling Water Injection | | | | |
| Mass Flow Beans and Water | 15617.6 | kg | | |
| Mass Flow Water | 2270 | kg | | |
| Bean/Water Temperature | 38.9° | C. | | |
| Water Temperature | 1.4° | C. | | |
| Mixed Temperature | 34.1° | C. | | |
| Final Cooling of Beans and Water | | | | |
| Mass Flow Recirculating Water | 20566.2 | kg | | |
| Mass Flow Ice Water | 22700 | kg | | |
| Bean and Water Temperature (In) | 34.3° | C. | | |
| Glycol Temperature (In) | −4° | C. | | |
| Bean and Water Temperature (Out) | 1.9° | C. | Btu Exchanged | 2174400 Btu\hr |
| Glycol Temperature (Out) | 20.9° | C. | | |
| Heat Load Summary | | | | |
| Ice Water | 2174400. | Btu/hr. | | |
| Cooling water | 588900. | Btu/hr. | | |
| Heating | 1371200. | Btu/hr. | | |
| Total | 4134500. | Btu/hr. | Total Heat Load | 1510230 Btu\hr |
| Regenerative Cooling | 5050500. | Btu/hr. | | |
| Regenerative Pre- | 5050500. | Btu/hr. | | |
| Heating | | | | |
| Total | 10101000. | | | |
| % Regeneration | 0.67 | 67% | | |

It will be appreciated that process requirements and product characteristics will vary and that the present invention is not restricted to the particular embodiment that has been described and illustrated, and that variations may be made therein without departing from the scope of the invention as found in the appended claims and equivalents thereof.

I claim:

1. An apparatus for continuously hydrating, cooking or blanching solids, comprising:

(a) a first elongated chamber having an interior space defined by walls and comprising (i) an inlet connected to an aqueous solvent source and a solid material source (ii) an outlet, (iii) a pumping means for increasing pressure within the interior of the first elongated chamber, (iv) a heating means for increasing temperature within the first elongated chamber, and (v) a conveyance means for conveying and mixing the aqueous solvent and the solid through the first elongated chamber;

(b) a second elongated chamber having an interior space defined by walls and comprising (i) an inlet connected to the outlet of the first elongated chamber, (ii) an outlet, and (iii) a means for conveying the solid material within the aqueous solvent through the second elongated chamber while maintaining pressure and temperature within the interior space of the second elongated chamber; and (c) a third elongated chamber having an interior space defined by walls and comprising (i) an inlet connected to the outlet of the second elongated chamber, (ii) an outlet for discharging the hydrated, cooked or blanched product, (iii) a cooling means for decreasing temperature within the third elongated chamber (iv) a pressure reduction means for decreasing the pressure within the third elongated chamber, and (v) a conveyance means for continuously conveying the combined aqueous and solid material through the outlet of the third elongated chamber.

2. The apparatus of claim 1 wherein the means for conveying the solid material within second elongated chamber comprises a single rotating spiral tubular structure.

3. The apparatus of claim 1 wherein the means for conveying the solid material within second elongated chamber comprises two rotating spiral tube structures having a common axis of rotation.

4. The apparatus of claim 1 wherein the means for conveying the solid within second elongated chamber comprises a double helix tubular structure.

5. The apparatus of claim 1 wherein the first elongated chamber further comprises a tank having a plurality of inlets and one outlet connected to the inlet of the first elongated chamber, wherein one inlet is connected to an aqueous source, and a second inlet is connected to a solid material source, wherein the tank further comprises: (i) a mixing means for continuously combining the aqueous solvent and the solid material, and (ii) a metering means for continuously discharging the mixed aqueous solvent and solid material.

6. The apparatus of claim 1 further comprising a fourth elongated chamber having an interior space defined by walls and comprising an inlet, an outlet, and a screen having an opening diameter less than a mean particle diameter of the solid material, wherein the inlet is connected to the outlet of the third elongated chamber.

7. The apparatus of claim 6, further comprising (a) a fifth elongated chamber having an interior space defined by walls and having a plurality of inlets and a plurality of outlets, wherein one inlet is connected to the outlet of the second elongated chamber, and a second inlet is connected to a fifth chamber fluid source having a temperature lower than that of the temperature of the mixed aqueous solvent and solid material, and having (i) a first conveyance means for conveying the mixed aqueous solvent and solid source through the fifth elongated chamber, (ii) a transfer means for transferring the solid material from the aqueous solvent to the fluid source, (iii) a second conveyance means for continuously conveying the mixed solid material and fifth chamber fluid source through a fifth chamber first outlet of the fifth elongated chamber, which first outlet is connected to the inlet of the third elongated chamber, and (iii) a third conveyance means for continuously conveying the aqueous solvent through a second outlet of the fifth elongated chamber, and (b) a sixth elongated chamber having an interior space defined by walls and having a plurality of inlets and a plurality of outlets, wherein a first inlet is connected to the mixed aqueous solvent source and solid material source of the first elongated chamber; and having (i) a first conveyance means for conveying the mixed aqueous solvent source and solid material through the sixth elongated chamber, (ii) a second inlet connected to a sixth chamber fluid source with a temperature higher than the temperature of the mixed aqueous solvent source and solid material source; (iii) a transfer means for transferring the solid material from the aqueous solvent to the sixth chamber fluid source; (iv) a second conveyance means for continuously conveying the mixed solid material and sixth chamber fluid source through a first outlet which is connected to the inlet of the first elongated chamber; and (v) a third conveyance means for continuously conveying the aqueous solvent through a second outlet of the sixth elongated chamber.

8. The apparatus of claim 7 wherein the second inlet in the fifth elongated chamber is connected to the aqueous solvent outlet of the sixth elongated chamber.

9. The apparatus of claim 8 wherein the fluid source inlet in the sixth elongated chamber is connected to the aqueous solvent outlet of the fifth elongated chamber.

10. The apparatus of claim 1, further compring a seventh elongated chamber having an interior space defined by walls and having an inlet, an outlet and a cooling means for decreasing the temperature of the combined aqueous and solid source to approximately zero °C., wherein the inlet is connected to the outlet of the third elongated chamber.

11. The apparatus of claim 1 wherein (a) the solid material source is over 19000 kg per hour of solid from dried legumes, (b) the pressure in the first elongated chamber is increased to greater than 1.75 kg/cm$^2$, (c) the temperature in the first elongated chamber is increased to approximately 115 to 135° C. and (d) the holding time period at the second elongated chamber is adequate to re-hydrate the dried legumes.

* * * * *